Figure 1:
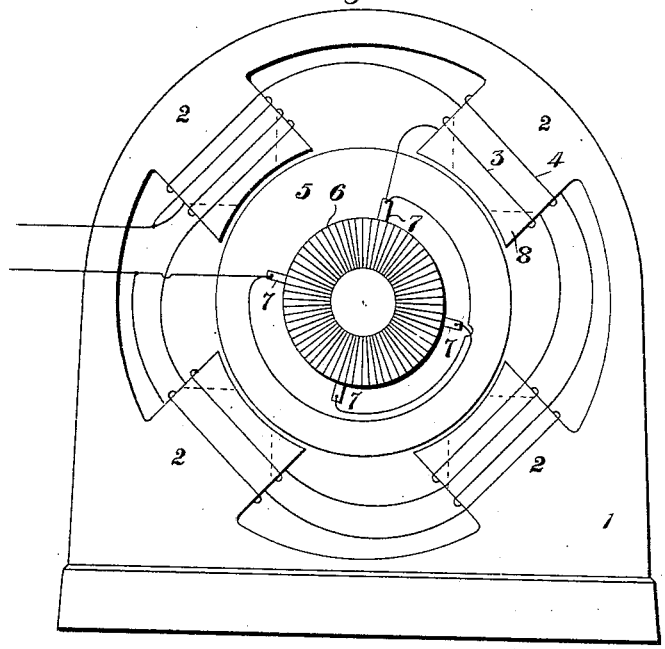

(No Model.)

N. W. STORER.
DYNAMO ELECTRIC MACHINE.

No. 562,864. Patented June 30, 1896.

WITNESSES:

INVENTOR
N. W. Storer
BY
Terry, MacKaye & Carr
ATTORNEYS.

UNITED STATES PATENT OFFICE.

NORMAN W. STORER, OF WILKINSBURG, PENNSYLVANIA, ASSIGNOR TO THE WESTINGHOUSE ELECTRIC AND MANUFACTURING COMPANY, OF PITTSBURG, PENNSYLVANIA.

DYNAMO-ELECTRIC MACHINE.

SPECIFICATION forming part of Letters Patent No. 562,864, dated June 30, 1896.

Application filed October 2, 1895. Serial No. 564,416. (No model.)

*To all whom it may concern:*

Be it known that I, NORMAN W. STORER, a citizen of the United States, residing in Wilkinsburg, in the county of Allegheny and State of Pennsylvania, have invented a new and useful Improvement in Dynamo-Electric Machines, (Case No. 668,) of which the following is a specification.

My invention relates to electric generators and motors, and it has for its object to provide a means whereby a constant point of commutation and a uniform distribution of field are maintained under varying load, whereby the iron and copper losses in the armature and the humming noise incident to the running of such machines may be reduced to a minimum, and whereby the air-gap between the field-magnet pole-pieces and the armature may be reduced to the smallest practicable limits.

It is generally understood that the action of a rotating armature upon the field-magnet poles due to the cross-magnetization set up thereby tends to strengthen one side of each pole and weaken the other, thus distorting the field and changing the line of commutation as the load is changed, unless some means is employed for counteracting this effect. It is obvious that some correcting means is necessary, or at least extremely desirable, in order that the shifting of the commutator-brushes in accordance with changes in the load may be avoided.

In order to get good commutation without shifting the commutator-brushes, it is necessary to either neutralize the armature reaction by some means, or to choke down the cross-magnetization by including a saturated element in the magnetic circuit. It has been a usual practice heretofore to provide such a saturated element or elements by slotting the armature, the teeth thus formed serving as the saturated element. This saturation of the armature-teeth is effected, however, at a considerable loss due to hysteresis and Foucault currents in the teeth. This means of regulation, when effective for the purpose intended, also shunts lines of force through the conducting-bars in the slots, thus generating Foucault currents in them which are productive of very considerable losses.

It is the purpose of my present invention to avoid these objectionable features by providing the field-magnet pole-pieces with the saturated elements necessary to secure a constant point of commutation, and at the same time effect other useful results by so locating the slots and teeth that they shall extend in the direction of rotation of the armature instead of at right angles thereto, as is the case when the slots are made in the armature-core.

Figure 2:
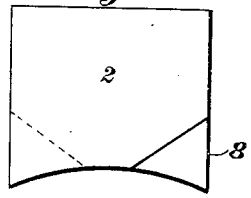
Figure 3:
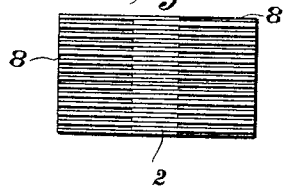

Referring to the accompanying drawings, Figure 1 is a side elevation, mainly diagrammatic, of a machine embodying my invention; and Fig. 2 is an enlarged detail view of a pole-piece constructed in accordance with my invention. Fig. 3 is a face view of such a pole-piece.

Referring to the drawings in detail, 1 is the frame of the machine provided with inwardly-projecting pole-pieces 2, on which are wound the usual series-coils 3 and shunt-coils 4.

5 represents the armature, and 6 the commutator, with which engage the usual brushes 7. The pole-pieces 2 are preferably built up of laminæ and cast into the frame of the machine. In order to provide the slots and teeth necessary to secure the results sought by my invention, I propose to cut off more or less of the projecting ends of some or all of the plates, as indicated at 8, the number of plates so treated being distributed evenly throughout the pole-piece. The number of these mutilated plates which are employed depends upon the conditions of working and the particular machine in which they are embodied. In most cases I find it desirable to cut off one corner of each plate and reverse the plates alternately from one side to the other of the pole-piece. By adopting this method all of the plates for the pole-pieces of any one machine or any number of machines of the same size may be cut in exactly the same way, and if found feasible or desirable, a considerable number may be cut at the same time.

I do not desire to limit my invention as regards the particular portions of the laminæ which are cut away, since it is obvious that variations may be made in practice, if desired. The only features which are essential to my invention are the slots or grooves and teeth in the faces of the pole-pieces which extend in a direction transverse to the armature-axis. I regard the arrangement shown as preferable, however, since it serves to locate the saturated element just where it is most needed and at a comparatively small expense of magnetizing force, since only the tips of the pole-pieces are saturated.

I have found that a machine constructed in accordance with this invention has a constant point of commutation and a uniformly-distributed field for all loads, and hence that no shifting of the commutator-brushes is necessary. This construction of field-magnet pole-pieces also prevents saturation of the armature-teeth and thus materially cuts down the iron and copper losses in the armature. Such a construction also obviates the humming noise which is ordinarily produced by the armature-teeth moving suddenly from a strong field into a position of no field, since it serves to gradually taper off the field. Such a construction also serves to provide pole-pieces which are substantially the same in effect as regards the distribution of the magnetic lines of force in the air-gaps as solid pole-pieces. It also permits of the use of a small air-gap and consequently a very small shunt-coil on account of the constant lead. Furthermore, since the output of a generator is mainly dependent upon the losses in the armature and upon the commutation, it follows that the output will be greatly increased by my invention on account of the possibility of employing deeper slots and heavier armature-conductors without producing excessive iron losses or sparking at the brushes.

A direct-current motor constructed in accordance with my invention has many of the advantages already enumerated and the additional one that the cross-magnetization of the armature will weaken the field as the load increases, and the machine will thus be speeded up enough to make up for the drop in armature-resistance, &c.

It is also apparent from the foregoing description that the construction is very simple and is readily adapted to existing machines and methods of constructing the same.

While the invention is primarily intended for use in connection with direct-current generators and motors, it is applicable to alternating-current generators when the cross-magnetization is excessive, since it will cut down the losses, reduce the noise, and keep the wave form constant on account of the uniform field.

I claim as my invention—

1. An electric generator or motor having field-magnet pole-pieces the extreme edges or tips of which are provided with slots or grooves extending transversely to the armature-axis.

2. An electric generator or motor having radial field-magnet pole-pieces provided with grooves or slots located at the extreme edges or tips and extending substantially at right angles to the armature-axis.

3. An electric generator or motor having laminated field-magnet pole-pieces some of the plates of which project beyond the corresponding portions of the adjacent plate or plates thereby forming slots or grooves which extend transversely to the armature-axis.

4. An electric generator or motor having laminated field-magnet pole-pieces the corners of the plates of which are alternately cut away, whereby narrow slots or grooves are formed which extend at right angles to the armature-axis.

5. A field-magnet pole-piece for electrical machines composed of a plurality of plates all of which are correspondingly cut away and alternately reversed in position, whereby alternately-arranged slots or grooves are provided at each side of the pole-piece.

In testimony whereof I have hereunto subscribed my name this 28th day of September, A. D. 1895.

NORMAN W. STORER.

Witnesses:
WESLEY G. CARR,
HUBERT C. TENER.